United States Patent Office 3,796,582
Patented Mar. 12, 1974

3,796,582
Zn-RICH COATINGS
Martin Joseph Leahey, Cheltenham, New South Wales, and John James Hartley, Hornsby, New South Wales, Australia, assignors to Berger, Jenson & Nicholson Limited, London, England
No Drawing. Filed Apr. 6, 1972, Ser. No. 241,795
Claims priority, application Great Britain, Apr. 6, 1971, 8,857/71
Int. Cl. C09d 5/10
U.S. Cl. 106—1
7 Claims

ABSTRACT OF THE DISCLOSURE

Paints based on organic titanate polymer binders and containing electrically conductive pigments, e.g., zinc, for the protection of steel work, are improved by the incorporation of an organic aliphatic titanate monomer such as butyl hexylene glycol titanate. The paints can be applied in relatively thick films having good adherence and resistance to cracking.

---

In the protection from corrosion of ferrous metals, e.g. steelwork, it is known to use paints based on inorganic binders and containing finely divided metal particles, usually aluminium or zinc, as pigment. Such paints are desirable for protecting surfaces exposed to temperatures above about 250° C., for example exhaust flues, pipelines carrying hot liquids, chemical plant and cylinder blocks of internal combustion engines, as well as surfaces which remain at ambient temperatures.

For most such purposes it is desirable to use relatively thick coatings of paint to provide good protection. It is known to base such inorganic heat-resisting paints on polymerized butyl titanate but in practice difficulties have been encountered. Thus when high proportions of metallic zinc pigment are used, to provide a so-called "zinc-rich" paint based on butyl titanium polymer, a paint coating with inferior mechanical properties results, while with lower proportions of zinc pigment the protection provided is insufficient.

It is moreover only practicable to apply such paints to substrates in relatively thin coatings, as otherwise the defect known as "mud-cracking" appears whereby the coatings tend to lose adhesion and to peel.

Silicate-based paints are also available to protect steel work from corrosion. Silicate paints have the advantage over titanate paints of being able to be applied as relatively thick coatings without cracking or peeling. However, silicate paints are not storage stable, and are commercially supplied as a two-pack product for admixture before use. Moreover, the corrosion resistance of coatings of silicate paints is not always satisfactory.

There is a need for a single-pack paint based on inorganic binders which is capable of being applied in thick coatings having good adherence and good resistance to corrosion.

The present invention provides a paint comprising electrically conductive pigment, and a binder comprising a major proportion of an alkyl titanate polymer and a minor proportion of an organic aliphatic titanate monomer. It has surprisingly been found that the presence of a minor proportion of an organic aliphatic titanate monomer in the binder can give rise to paints which can be applied in relatively thick films of from 25 to 120 microns, generally from 40 or 80 to 100 microns, without mud-cracking.

The electrically conductive pigment preferably consists of metallic zinc. However, minor proportions of zinc dust may be replaced by other conductive pigments, e.g. other metals, aluminium or graphite. In particular, up to 25% by weight of the zinc may be replaced by graphite, e.g. ordinary flaked graphite or micronized grade graphite. Paints containing some graphite may have improved resistance to settling on storage.

The electrically conductive pigment is preferably present in an amount of from 75% to 92% by weight, particularly from 78% to 89%, on the non-volatile content of the paint. The use of too little electrically conductive pigment gives rise to coatings having inferior resistance to corrosion. The use of too much electrically conductive pigment gives rise to somewhat underbound coatings which are liable to crack on flexing and may crack on ageing.

The proportion of binder is preferably from 6% to 25% by weight on the non-volatile content of the paint. The proportion of alkyl titanate polymer to organic aliphatic titanate monomer is preferably from 75:25 to 99:1, preferably from 80:20 to 96:4. The use of too little titanate monomer gives rise to paints which are not appreciably better than the unsatisfactory titanate paints previously known. The use of too much titanate monomer reduces the binding power of the binder.

The nature of the alkyl titanate polymer is not critical. Polymers of butyl titanate are available commercially, and are preferred for that reason, although there is no reason why polymers of other alkyl titanates, e.g. hexyl or octyl titanate, should not be used. Alkyl titanate polymers may be prepared in one step by reacting titanium tetrachloride with a mixture of water and the alcohol, the degree of polymerization being controlled by the amount of water present. The polymers may be characterized in terms of their $TiO_2$ content. Suitable commercially available grades of butyl titanate polymer have $TiO_2$ contents ranging from 27.6% to 36% by weight. These polymers are soluble in the common organic solvents, e.g. ethyl alcohol and hydrocarbons. Polymers having $TiO_2$ contents of up to about 60% by weight are generally soluble in hydrocarbon solvents. Polymers having $TiO_2$ contents above about 50% may, however, show inferior adhesion to substrates. We prefer to use a polymer having a $TiO_2$ content of 34.1% to 35.0% by weight.

The organic aliphatic titanate monomer is a compound which does not contain Ti-O-Ti linkages, and may be a titanate of an alcohol, a glycol or an alkanolamine. Each organic group may contain from 1 to 12 or more carbon atoms. Titanates derived, at least in part, from glycols are preferred. Mixed titanates may be used, for example, titanates of alcohol/glycol combinations. It is believed that the function of the titanate monomer in the paint is dependent on its moderate rate of hydrolysis in moist air, and that long chain glycols may hydrolyze too slowly to be very effective. Suitable organic aliphatic titanate monomers include the following, of which the first two are particularly preferred:

Butyl hexylene glycol titanate.
Octylene glycol titanate.
Iso-octyl titanate.
Ethylene glycol titanate.
Polyethylene glycol titanate.
2-ethylhexyl titanate.
Nonyl titanate.
Triethanolamine titanate.
Propylene glycol titanate.
Polypropylene glycol titanate.

The paint is generally applied with the binder in solution in a volatile organic liquid medium. The nature of this medium is not critical to the invention. It is usual to use hydrocarbons, for example, toluene, xylene or mineral turpentine, but polar solvents, e.g. aliphatic alcohols and ether alcohols, may be useful, in conjunction with montmorillonite derivatives, to reduce settling on storage. Because the titanate materials present tend to gel in the presence of water, the paints are formulated and stored under substantially anhydrous conditions.

The corrosion resistance of the paints may be improved by the incorporation of mica, in an amount of from 0.1% to 15%, preferably 2.8% to 12%, by weight on the weight of the electrically conductive pigment.

As additives to assist suspension of the pigment on storage and prevent cracking, there may be added montmorillonite derivatives, e.g. that available as bentone, and ethyl cellulose derivatives. The use of anti-settling agents is widespread in this type of paint.

There may also be included in the paint from 0.1% to 5%, e.g. from 0.5% to 3%, by weight on the non-volatile content of the paint, of an organic silane. Such silanes can help to improve adhesion and resistance to fire and cracking. Suitable silanes include alkyl alkoxy silanes, for example methyl trimethoxy silane.

The paint may also include such other pigments, fillers, extenders, antioxidants and additives as may be desired.

The paints are prepard by mixing the ingredients together in known manner to provide a single-pack storage-stable composition.

As already mentioned the compositions of the invention are especially useful for protecting substrates of ferrous metals, e.g. steel, to which they may be applied by brushing or spraying, additional organic solvent being used if necessary to reduce the compositions to a suitable consistency. The surface before application of the compositions must be well-cleaned. In the case of steel, after removal of oil and grease the surface should be substantially freed from oxidation product, preferably by blast-cleaning, after which the composition should be applied as soon as possible.

The compositions after application become cured and hardened through chemical interaction with atmospheric moisture, during which process organic components of the titanates, especially butyl alcohol, become freed and are largely lost from the coating by evaporation.

In the field of electrically conducting paints, it is customary to express the proportion of conductive pigment as a percentage of the cured film, assuming complete removal of organic material. Owing to uncertainty as to how much organic material is in fact lost, how much atmospheric moisture is absorbed by the various titanates present, and to what extent the zinc becomes oxidized during exposure, such expressions may not be realistic when applied to the present compositions. It has therefore been preferred to express the conductive pigment as a percentage of the non-volatile content of the paint as deposited. As a rough guide, however, it appears that with butyl titanate a 60% to 70% loss of butyl radical occurs on exposure of the paint in the form of a thin film.

The compositions of this invention find especial usefulness as priming paints for iron and steel, and offer long-term protection. If it is desired to overcoat them with more conventional types of paint compositions, for example for providing a selected color, overcoating paints of known type based on chlorinated rubber, vinyl or epoxide resins are preferred.

The following examples illustrate the invention.

EXAMPLE 1

| | |
|---|---:|
| Butyl titanate polymer (containing 35% to $TiO_2$) | 8.09 |
| Butyl hexylene glycol titanate (containing 27% $TiO_2$) | 0.84 |
| Zinc dust pigment | 60.71 |
| Mica pigment | 1.69 |
| Montmorillonite derivative | 1.69 |
| Aromatic hydrocarbon solvent | 26.98 |
| | 100.00 |
| Weight per gallon, lbs. | 20.24 |
| Non-volatile content (as deposited), percent | 73.02 |

When applied in the manner hereinbefore described as a coating on a prepared steel panel and submitted to the ASTM Salt Fog Test the coating was still in good condition after 5 weeks. In contrast, another paint, otherwise similar, in which the zinc pigment content was reduced to 85%, exhibited poor corrosion resistance under the same test conditions.

EXAMPLES 2 TO 21

The formulations of the paints of Examples 2 to 21 are set out in Table I below, figures being based on the total weight of the paint unless otherwise stated.

The paints of Examples 2 to 21 were sprayed on to grit-blasted steel test panels in the form of coatings from 40 to 120 microns thick. Properties of the coatings are set out in Table II below, where ratings are given on a scale ranging from 0 for complete failure to 10 for perfect performance. "Exposure 45° watered" means that the coated panels were exposed outdoors at an angle of 45° to receive maximum sunlight and sprayed with town water at regular intervals.

Key to Table I

BHGT—Butyl hexylene glycol titanate
IOT—Iso-octyl titanate
2EHT—2-ethyl hexyl titanate
NT—Nonyl titanate
TT—Tri-ethanolamine titanate

TABLE I

| Example | 2 | 3 | 4 | 5 | 6 | 7 | 8 | 9 | 10 | 11 |
|---|---|---|---|---|---|---|---|---|---|---|
| Butyl titanate polymer (wt. percent) | 8.42 | 8.54 | 8.07 | 7.06 | 7.48 | 8.97 | 8.49 | 7.43 | 7.85 | 8.43 |
| Aliphatic titanate monomer (wt. percent) | BHGT 0.87 | BHGT 0.43 | BHGT 0.41 | BHGT 1.41 | BHGT 1.50 | BHGT 0.46 | BHGT 0.43 | BHGT 1.49 | BHGT 1.57 | BHGT 0.88 |
| Hydrocarbon solvent (wt. percent) | 24.57 | 23.74 | 22.42 | 22.43 | 23.75 | 24.90 | 23.57 | 23.57 | 24.91 | 24.76 |
| Mica (wt. percent) | 1.74 | 0.65 | 6.14 | 6.14 | 0.65 | 0.63 | 5.97 | 5.97 | 0.63 | 1.74 |
| Bentone (wt. percent) | 1.74 | 1.68 | 1.59 | 1.59 | 1.69 | 1.77 | 1.68 | 1.68 | 1.77 | 1.73 |
| Zinc dust (wt. percent) | 62.66 | 64.96 | 61.37 | 61.37 | 64.95 | 63.27 | 59.86 | 59.86 | 63.27 | 62.66 |
| Graphite (wt. percent) | | | | | | | | | | |
| Wt. percent zinc dust on non-volatile material | 83.1 | 85.2 | 79.1 | 79.1 | 85.2 | 84.2 | 78.3 | 78.3 | 84.3 | 83.1 |
| Wt. percent titanate monomer on titanate polymer | 10.3 | 5 | 5.1 | 20 | 20 | 5.1 | 5 | 20 | 20 | 10.4 |
| Wt. percent mica on zinc | 2.8 | 1 | 10 | 10 | 1 | 1 | 10 | 10 | 1 | 2.8 |
| Wt. percent mica and graphite on zinc | 2.8 | 1 | 10 | 10 | 1 | 1 | 10 | 10 | 1 | 2.8 |

| Example | 12 | 13 | 14 | 15 | 16 | 17 | 18 | 19 | 20 | 21 |
|---|---|---|---|---|---|---|---|---|---|---|
| Butyl titanate polymer (wt. percent) | 7.44 | 8.50 | 7.44 | 8.50 | 7.44 | 8.50 | 7.44 | 8.50 | 8.58 | 9.25 |
| Aliphatic titanate monomer (wt. percent) | 10T 1.49 | 10T 0.43 | 2EHT 1.49 | 2EHT 0.43 | NT 1.49 | NT 0.43 | TT 1.49 | TT 0.43 | BHGT 1.72 | BHGT 1.85 |
| Hydrocarbon solvent (wt. percent) | 23.56 | 23.56 | 23.56 | 23.56 | 23.56 | 23.56 | 23.56 | 23.56 | 27.18 | 21.51 |
| Mica (wt. percent) | 5.99 | 5.99 | 5.99 | 5.99 | 5.99 | 5.99 | 5.99 | 5.99 | 0.70 | 0.75 |
| Bentone (wt. percent) | 1.66 | 1.66 | 1.66 | 1.66 | 1.66 | 1.66 | 1.66 | 1.66 | 1.92 | 2.07 |
| Zinc dust (wt. percent) | 59.86 | 59.86 | 59.86 | 59.86 | 59.86 | 59.86 | 59.86 | 59.86 | 55.24 | 29.54 |
| Graphite (wt. percent) | | | | | | | | | | 4.66 | 5.03 |
| Wt. percent zinc dust on non-volatile material | 78.3 | 78.3 | 78.3 | 78.3 | 78.3 | 78.3 | 78.3 | 78.3 | 75.90 | 75.90 |
| Wt. percent titanate monomer on titanate polymer | 20 | 5.1 | 20 | 5 | 20 | 5.1 | 20 | 5.1 | 20.06 | 20.06 |
| Wt. percent mica on zinc | 10 | 10 | 10 | 10 | 10 | 10 | 10 | 10 | 1.26 | 1.26 |
| Wt. percent mica and graphite on zinc | 10 | 10 | 10 | 10 | 10 | 10 | 10 | 10 | 9.7 | 9.7 |

TABLE II

| Example | Salt fog, 8 weeks, ASTM B117 | | | | Exposure, 45° watered microcrack | |
|---|---|---|---|---|---|---|
| | Rusting | | Blister | | | |
| | Face | Scribe | Face | Scribe | 4 months | 3½ months |
| 2 | 10.9 | 8.9 | 10.8 | 10.8 | 5 | |
| 3 | 9 | 8½ | 10— | 10 | 4 | |
| 4 | 8 | 9 | 9 | 10 | 10 | |
| 5 | 10— | 10— | 9 | 10 | 10 | |
| 6 | 9 | 5 | 9 | 10 | 5 | |
| 7 | 10 | 4 | 8 | 10 | 4 | |
| 8 | 8 | 7 | 9 | 10 | 10 | |
| 9 | 9 | 10— | 10 | 10 | 10 | |
| 10 | 9 | 8½ | 9 | 10 | 5 | |
| 11 | 9 | 7½ | 10 | 9 | | 5 |
| 12 | 7½ | 7 | 10 | 10 | | 10 |
| 13 | 8 | 7 | 10 | 10 | | 10 |
| 14 | 7 | 4½ | 9 | 10 | | 10 |
| 15 | 7½ | 7 | 10 | 10 | | 10 |
| 16 | 7½ | 7 | 10 | 10 | | 10 |
| 17 | 7½ | 7 | 10 | 10 | | 10 |
| 18 | 7 | 4 | 10— | 10— | | 10 |
| 19 | 8 | 2½ | 10— | 10— | | 10 |
| 20 | 6 | 4 | 10 | 10 | | 7.5 |
| 21 | 6 | 1 | 10 | 10 | | 9.5 |

We claim:
1. In a paint comprising
(a) electrically conductive pigment in a proportion of from 75% to 92% by weight based on the non-volatile content of the paint, said electrically conductive pigment comprising at least 75% by weight of metallic zinc, and
(b) a binder in a proportion of from 6% to 25% by weight based on the non-volatile content of the paint, said binder comprising an alkyl titanate polymer containing up to 50 percent $TiO_2$; the improvement comprising, as a component of said binder, a monomeric titanate ester of at least one member selected from the group consisting of alcohols, glycols and alkanolamines of 1 to 12 carbon atoms in a weight ratio of polymer to ester from 75:25 to 99:1.

2. A paint as claimed in claim 1, wherein the electrically conductive pigment is present in a proportion of from 78% to 89% by weight based on the non-volatile content of the paint.

3. A paint as claimed in claim 1, wherein the alkyl titanate polymer is a butyl titanate polymer.

4. A paint as claimed in claim 1, wherein the titanate ester is a butyl hexylene glycol titanate or an octylene glycol titanate.

5. A paint as claimed in claim 1, wherein there is also present from 0.1% to 15% by weight on the weight, based of the electrically conductive pigment, of mica.

6. A method of protecting a ferrous metal, which comprises applying to the ferrous metal a coating, from 25 to 120 microns thick, of the paint claimed in claim 1.

7. A ferrous metal having a coating derived from the paint claimed in claim 1.

References Cited
UNITED STATES PATENTS

| 2,058,844 | 10/1936 | Vaughn | 106—38.2 |
| 3,442,824 | 5/1969 | Chandler | 117—135.1 |
| 3,469,071 | 9/1969 | Feldt et al. | 117—135.1 |

LORENZO B. HAYES, Primary Examiner

U.S. Cl. X.R.

106—14; 117—131, 132 R; 260—37 M